United States Patent
Lomax et al.

(10) Patent No.: US 6,368,735 B1
(45) Date of Patent: Apr. 9, 2002

(54) FUEL CELL POWER GENERATION SYSTEM AND METHOD FOR POWERING AN ELECTRIC VEHICLE

(75) Inventors: Franklin Delano Lomax, Alexandria, VA (US); Mujeeb Ismael Ijaz, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/421,020

(22) Filed: Oct. 19, 1999

(51) Int. Cl.[7] .......................... H01M 8/04; H01M 8/18; H01M 8/06
(52) U.S. Cl. .............................. 429/17; 429/19; 429/20; 429/25; 429/34
(58) Field of Search .............................. 429/17, 19, 20, 429/25, 34; 29/623.1

(56) References Cited

U.S. PATENT DOCUMENTS

| | | | | |
|---|---|---|---|---|
| 3,607,419 A | * | 9/1971 | Keating | |
| 3,957,534 A | * | 5/1976 | Linkohr et al. | |
| 4,098,959 A | * | 7/1978 | Fanciullo | |
| 4,098,960 A | * | 7/1978 | Gagnon | |
| 4,650,728 A | * | 3/1987 | Matsumura et al. | |
| 4,828,940 A | * | 5/1989 | Cohen et al. | 429/20 |
| 4,952,465 A | * | 8/1990 | Harris et al. | 429/60 |
| 5,141,823 A | * | 8/1992 | Wright et al. | 429/19 |
| 5,272,017 A | * | 12/1993 | Swathirajan et al. | |
| 5,527,632 A | * | 6/1996 | Gardner | 429/27 |
| 5,629,102 A | * | 5/1997 | Werth | |
| 5,686,196 A | * | 11/1997 | Singh et al. | |
| 5,794,732 A | * | 8/1998 | Lorenz et al. | |
| 5,861,137 A | * | 1/1999 | Edlund | |
| 6,063,515 A | * | 5/2000 | Epp et al. | 429/17 |
| 6,126,908 A | * | 10/2000 | Clawson et al. | 422/190 |

FOREIGN PATENT DOCUMENTS

| | | |
|---|---|---|
| GB | 2 268 322 A | 1/1994 |
| JP | 57078773 A | 5/1982 |
| JP | 63231878 A | 9/1988 |

* cited by examiner

Primary Examiner—Carol Chaney
Assistant Examiner—Tracy Dove
(74) Attorney, Agent, or Firm—Damian Porcari

(57) ABSTRACT

A fuel cell power generation system for powering an electric vehicle. The system comprises a low temperature fuel cell, a reactor comprising a reformer for converting hydrogen-containing fuel into a reformate gas comprising a hydrogen gas stream and a by-product gas stream. The reactor further comprises and a metal membrane separator for separating the hydrogen gas stream from the by-product gas stream. A metal hydride buffer is provided in line between the fuel cell and the membrane separator. The metal hydride buffer is capable of selectively storing hydrogen from the hydrogen gas stream and releasing the hydrogen.

19 Claims, 1 Drawing Sheet

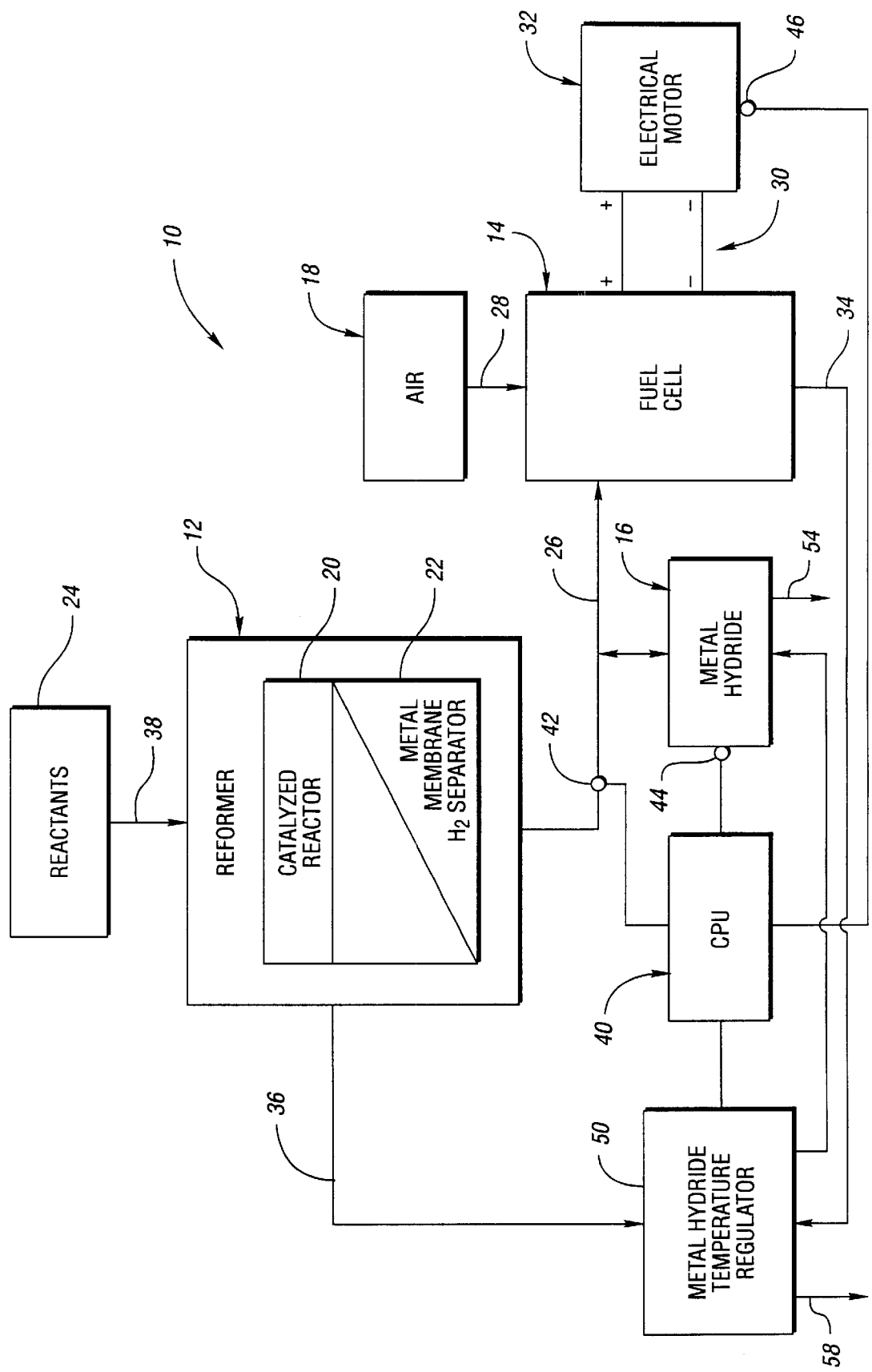

FUEL CELL POWER GENERATION SYSTEM AND METHOD FOR POWERING AN ELECTRIC VEHICLE

TECHNICAL FIELD

The present invention relates to a fuel cell power generation system and a method for powering an electric vehicle.

BACKGROUND ART

Development of the electric vehicle has recently undergone increased activity in an effort to reduce air pollution and conserve fuel resources. A major stumbling block in the development of electric vehicles has been developing a suitable means of supplying power for the electrical drive motors. In most instances, the power has been supplied from a battery source. However, the current battery technology is not capable of supplying a sufficient amount of energy to power the vehicle over extended distances.

Fuel cells have recently been examined as an alternative power source for electrical vehicles. A fuel cell is a demand-type power system in which the fuel cell operates in response to the load imposed across the fuel cell. Typically, a liquid hydrogen-containing fuel (e.g., gasoline, methanol, diesel, naphtha, etc.) serves as the fuel supply for the fuel cell once converted to a gaseous stream that contains hydrogen. This is accomplished when the hydrogen-containing fuel is passed through a fuel reformer to convert the liquid fuel to a hydrogen gas (20–75% depending on the liquid fuel) that usually contains other passivating gas species such as carbon monoxide, carbon dioxide, methane, water vapor, oxygen, nitrogen, unburned fuel and, in some cases, hydrogen sulfide. The hydrogen is then used by the fuel cell as a fuel. An oxidant, usually air, is also supplied to the fuel cell to react with the hydrogen fuel to produce electric current. The electric current can then be drawn on demand in response to loads across the fuel cell to power electrical devices, such as an electric motor of an electric vehicle.

The invention disclosed herein will identify solutions to the following deficiencies in prior art systems:

(1) startup time;
(2) fuel cell system size and cost;
(3) reformer system size and cost;
(4) transient response time of the reformer; and
(5) elimination of passivating gas species damaging the fuel cell.

In most prior art systems, the DC load on the fuel cell is sensed and hydrogen and oxidant are supplied to the fuel cell to meet the demand upon the fuel cell. The problem associated with these prior art fuel cell systems is that while the response time of the fuel cell to changes in the load is theoretically essentially instantaneous, the response time of the processor in the flow of the liquid fuel to the reformer and the hydrogen from the reformer to the fuel cell is too time-consuming to meet the changing load requirements on the fuel cell. Thus, the fuel cell does not perform acceptably during large power demand instances. Furthermore, the reactions that take place required to release hydrogen from carbon form carbon dioxide and carbon monoxide (a fuel cell poison). During transient operation, a typical fuel reformer will allow unacceptable carbon monoxide levels through to the fuel cell causing potential failure of the system.

Moreover, another problem that faces liquid-fueled (reformers) fuel cell power systems in electric vehicles is that the fuel cell power system takes much longer (~1 minute) to start up than conventional vehicle systems (~3 seconds). In prior art systems, the reformer will not deliver usable hydrogen to the fuel cell until the operating temperature is reached, or nearly reached. This delay results in customer dissatisfaction with their product. Furthermore, this startup period is most susceptible to transient chemistry yielding much greater carbon monoxide levels than is acceptable, further delaying good response from the fuel cell (carbon monoxide poisoning gets much worse as the fuel cell nears ambient temperature as in startup conditions).

Moreover, another problem that faces liquid-fueled fuel cell power systems in electric vehicles is that the fuel cell power systems are relatively larger heavy and expensive. This is due in part to the existence of contaminants and diluents (i.e., non-hydrogen gases) in the hydrogen fuel provided to the fuel cell. These contaminants and diluents cause a relatively significant reduction in the power production per unit weight and volume of the fuel cell.

Accordingly, it would be desirable to provide a fuel cell power generation system for an electric vehicle which responds essentially instantaneously to large power demands without concern over carbon monoxide and other harmful gases, and is able to start up an electric vehicle engine in less than about three seconds.

It would also be further desirable to be able to provide a fuel cell power generation system which is lighter, smaller and more economical than other fuel cell power generation systems currently used for powering electric vehicles.

DISCLOSURE OF INVENTION

The present invention relates to a fuel cell power generation system for powering an electric vehicle. The system comprises a low temperature fuel cell, a reactor comprising a reformer for converting hydrogen-containing fuel into a reformate stream, and a metal membrane separator.

The reformate stream comprises a hydrogen gas stream. The metal membrane separator is capable of separating the hydrogen gas stream from the reformate stream. The fuel cell power generation system also includes a metal hydride buffer. The metal hybrid buffer is in line between the fuel cell and the membrane separator. The metal hydride buffer is capable of selectively storing hydrogen from the hydrogen gas stream and releasing the hydrogen.

The present invention also relates to a method for operating an electric vehicle powered by a fuel cell power generation system comprising a low temperature fuel cell, a reactor comprising a reformer, a metal membrane separator, and a metal hydride buffer, in line between the fuel cell and the membrane separator. The method comprises supplying hydrogen-containing fuel to the reformer, and converting hydrogen-containing fuel in the reformer to a reformate gas comprising a hydrogen gas stream and a by-product gas stream. The hydrogen gas stream is directed through the metal membrane separator to separate the hydrogen gas stream from the by-product gas stream, and the hydrogen gas is directed to the fuel cell to supply fuel to the fuel cell.

The present invention provides a fuel cell power generation system which, relative to prior art systems, reduces engine startup time, fuel cell system size and cost, reformer system size and cost, and transient response time of the reformer as well as eliminates the damage to the fuel cell from passivating gas species such as carbon monoxide and hydrogen sulfide.

BRIEF DESCRIPTION OF DRAWING

The FIGURE is a schematic diagram of the fuel cell power generation system for powering an electric vehicle of the present invention.

BEST MODE FOR CARRYING OUT THE INVENTION

The FIGURE illustrates a preferred embodiment of a fuel cell power generation system 10 for powering an electric vehicle (not shown) of the present invention. The system 10 comprises a fuel reformer 12, a fuel cell 14, and a metal hydride buffer 16. The metal hydride buffer 16 is provided in line between the fuel reformer 12 and the fuel cell 14.

The fuel cell 14 is preferably a polymer electrolyte membrane (PEM) fuel cell comprising an anode and a cathode which are separated by a polymer electrolyte membrane. The PEM fuel cell 14 is a low temperature fuel cell, operating at a temperature of about 60 to 110° C. While the fuel cell power generation system 10 is being described as having one PEM fuel cell, it should be understood that the fuel generation system can, and preferably does, comprise a plurality of PEM fuel cells. The number of PEM fuel cells will mainly depend on the power demand of the electric vehicle.

Hydrogen fuel, supplied from a hydrogen gas stream indicated by arrow 26, and an oxidant, indicated by arrow 28, such as air from air source 18, are supplied to the fuel cell 14 wherein they react to produce an electric current 30 which can be drawn on demand in response to the power demands of an electric motor 32 of the electric vehicle (not shown). The fuel cell 14 exhausts a fuel cell oxidant exhaust gas stream, as indicated by arrow 34. The fuel cell oxidant exhaust gas stream 34 exits the fuel cell 14 as a temperature of about 25–150° C., more preferably about 75–125° C., and most preferably about 100° C., and is used to control the absorbing and desorbing action of the metal hydride buffer 16, as will be explained below in more detail.

The fuel reformer 12 generates the hydrogen gas stream 26 to provide fuel for the fuel cell 14. The fuel reformer 12 is an integrated reformer comprising a catalyzed reactor 20 and a dense metal membrane hydrogen separator 22. The fuel reformer 12 is arranged to receive reactants (i.e., fuel and an oxidant), indicated by arrow 38, from a reactant source 24.

The reactants 38 comprise a hydrogen-containing fuel, such as gasoline, propane, natural gas, propane, naphtha, methanol, ethanol, etc. The reactants 38 also comprise a suitable oxidant such as water, steam, or air.

The fuel reformer 12 converts the reactants 38 into a hydrogen-rich reformate gas in the catalyzed reactor 20. The fuel reformer 12 may be any type of reformer which is capable of converting a hydrogen-containing fuel into a hydrogen-rich reformate gas. Suitable types of fuel reformers 12 include, but are not necessarily limited to, steam reformers, partial oxidation reformers, and autothermal reformers. In the preferred embodiment, the fuel reformer 12 is a steam reformer and the hydrogen-containing fuel is gasoline.

The reformate gas essentially comprises a hydrogen gas stream and a by-product gas stream, with the by-product gas comprising the carbon dioxide, carbon monoxide, water vapor and methane. In the preferred embodiment (i.e., when the fuel reformer 12 comprises a steam reformer), the hydrogen is present in the reformate gas in an amount of from about 10 to about 80 volume percent, more preferably from about 15 to about 25 volume percent, and most preferably about 20 volume percent, based on the volume of the reformate gas. In the preferred embodiment, the by-product is present in the reformate gas in an amount of from about 20 to about 90 volume percent, more preferably from about 75 to about 85 volume percent, and most preferably about 80 volume percent, based on the volume of the reformate gas.

In the preferred embodiment, the carbon monoxide is present in the reformate gas in an amount of from about 1 to about 10 volume percent, more preferably from about 2 to about 5 volume percent, and most preferably about 3.5 volume percent, based on the volume of the reformate gas. In the preferred embodiment, the carbon dioxide is present in the reformate gas in an amount of from about 10 to about 25 volume percent, more preferably from about 15 to about 20 volume percent, and most preferably about 18 volume percent, based on the volume of the reformate gas. In the preferred embodiment, the water vapor is present in the reformate gas in an amount of from about 35 to about 65 volume percent, more preferably from about 40 to about 55 volume percent, and most preferably about 50 volume percent, based on the volume of the reformate gas. In the preferred embodiment, the methane is present in the reformate gas in an amount of from about 3 to about 20 volume percent, more preferably from about 5 to about 10 volume percent, and most preferably about 8 volume percent, based on the volume of the reformate gas.

The temperature inside the reactor 20 during the reaction is preferably between about 300–800° C., and is typically about 700° C. The pressure inside the reactor is usually between about 10–20 atmospheres. The temperature of the reformate gas as it exits the reactor 20 is less than about 450° C., and more preferably between about 375–425° C.

The reformate gas is then directed, under a pressure of about 10–20 atmospheres, towards the metal membrane hydrogen separator 22 where the hydrogen gas stream is separated from the by-product gas stream (i.e., reformate gas minus the hydrogen). The use of the dense metal membrane hydrogen separator 22 is critical to the present invention. The dense metal membrane hydrogen separator 22 allows the fuel reformer 12 to generate an essentially pure hydrogen gas stream. The use of an essentially pure hydrogen gas stream optimizes performance of the fuel cell power generation system because gases other than hydrogen, such as the carbon monoxide, carbon dioxide, water vapor and methane found in the by-product gas stream, will contaminate (i.e., take-up active sites) the fuel cell 14 and the metal hydride buffer 16, thereby decreasing their efficiency over time. By providing an essentially pure hydrogen gas stream, the dense metal membrane hydrogen separator 22 enables to present invention to operate acceptably with a relatively small fuel cell 14 since essentially no active sites on the fuel cell are rendered inoperable due to contamination of the fuel cell from non-hydrogen gases.

The metal membrane hydrogen separator 22 is preferably a dense metal membrane separator. More preferably, the dense metal membrane separator 22 is made of palladium or palladium alloy, however, other configurations using composites of Palladium, or palladium alloys and other metals such as platinum, nickel, vanadium, niobium, tantalum, chromium, iron, and tungsten, or alloys thereof, may be used as well. The dense metal membrane separator 22 forms an alloy with atomic hydrogen using diffusion to permeate through the membrane separator as H.

The hydrogen gas stream 26, upon exiting the membrane separator 22 and thus, the reformer 12, due to the use of the membrane separator is preferably at least about 90 percent pure hydrogen, more preferably at least about 99 percent pure hydrogen, and even more preferably at least about 99.99 percent pure hydrogen, and most preferably about 99.999 percent pure hydrogen (i.e., comprises about 99.999 percent hydrogen and 0.001 percent impurities such as carbon monoxide, carbon dioxide, methane and water vapor). Preferably, the hydrogen gas stream 26 comprises less than about 0.002 volume percent carbon monoxide, more preferably less than about 0.001 volume percent, and most preferably about 0 volume percent, at all operating conditions (i.e., during system startup, shut down and normal and transient operating conditions). The hydrogen gas stream 26 exiting the reformer 12 is directed, under a pressure of about 1.1–5 atmospheres, and most preferably about 3 atmospheres, towards the fuel cell 14. Hydrogen gas in the hydrogen gas stream 26 is then either consumed by the fuel cell 14 or stored in the metal hydride buffer 16 for later use by the fuel cell.

The hydrogen forms an intermetalic with the dense metal membrane. The membrane separator 22 does not allow the by-product gas stream to pass through. The by-product gas stream exists the reactor 20 upstream of the separator 22 and out of the reformer 12, as indicated by arrow 36. The by-product gas stream 36 exits the reformer 12 at a temperature of about 400–500° C., and is used to control the hydrogen absorbing and desorbing action of the metal hydride buffer 16, as will be explained below in more detail.

The metal hydride buffer 16 will store hydrogen according to the absorption isotherm characteristic (by pressure and temperature differential). During a low demand where hydrogen pressure is high at the metal hydride buffer 16, heat is removed from (i.e., a cooling source is applied to) the metal hydride buffer 16, so that the metal hydride buffer 16 will charge (i.e., absorb) hydrogen.

The metal hydride buffer 16 stores the hydrogen from the hydrogen gas stream 26 which is not presently needed to fuel the fuel cell 14. The fuel cell 14 will consume only as much of the hydrogen gas stream 26 as is necessary to respond to the current power demand of the electric motor 32. The remaining hydrogen in the hydrogen gas stream 26 is absorbed into the metal hydride buffer 16.

The metal hydride buffer 16 will store hydrogen according to the absorption isotherm characteristic (by pressure and temperature differential). During a low demand where hydrogen pressure is high at the metal hydride buffer 16, hydrogen will and a heat is removed from (i.e., a cooling source is applied to) the metal hydride buffer 16, the metal hydride buffer 16 will charge (i.e., absorb hydrogen).

Upon demand, wherein a pressure drop is expected and/or a heating load is applied to the metal hydride buffer 16, the metal hydride buffer 16 will desorb hydrogen. In other words, when the electric motor 32 places a power demand on the fuel cell 14 which exceeds the available hydrogen in the hydrogen gas stream 26, i.e., peak demand times, such as accelerating or engine startup, the metal hydride buffer 16 releases, or desorbs, hydrogen to be consumed by the fuel cell to meet the power demand of the electric motor 32.

A central processing unit (CPU) 40 is provided to control the absorbing and desorbing activity of the metal hydride buffer 16. The CPU 40 communicates with a hydrogen pressure sensor 42 disposed between the fuel reformer 12 and the fuel cell 14, a temperature sensor 44 associated with the metal hydride buffer 16 and an electrical load sensor 46 associated with the electric motor 32. The CPU 40 continuously monitors (i) the pressure of hydrogen being directed from the reformer 12 to the fuel cell 14, and (ii) the temperature of the metal hydride buffer 16 by continuously monitoring the signals from the hydrogen pressure sensor 42, the temperature sensor 44, respectively. The CPU 40 may also continuously monitor the power demand of the electric motor 32, by continuously monitoring the signals from the electrical load sensor 46.

When the CPU 40 determines that the electric motor 32 is placing a power demand on the fuel cell 14 which requires more hydrogen than is currently supplied by the hydrogen gas stream 26 and/or that the pressure of hydrogen being directed from the reformer 12 to the fuel cell 14 is dropping below the desired value because the hydrogen demand is higher than the supply from the reformer 12, the CPU activates the metal hydride buffer 16 to release (i.e., desorb) hydrogen for consumption by the fuel cell 14, thereby increasing the pressure of the hydrogen available to the fuel cell, and thus the power output of the fuel cell.

The CPU 40 directs a metal hydride temperature regulator 50 to supply heat to the metal hydride buffer 16 to activate the metal hydride buffer to desorb hydrogen. The heat supplied by the regulator 50 to raise the temperature of the buffer 16 is provided by directing the by-product gas stream 36, which exits the reformer at temperature of about 500° C. through a portion of the metal hydride buffer 16. The by-product gas stream raises the temperature of the buffer 16 and activates the buffer to desorb hydrogen. The by-product gas stream after passing through the buffer 16 exits the buffer as shown by arrow 54. When the CPU 40 determines that there is enough hydrogen in the hydrogen gas stream 26 to meet the power demand of the electric motor 32, the regulator 50 directs the by-product gas stream out of the system 10, as indicted by arrow 58.

When the CPU 40 determines that the electric motor 32 is placing a power demand on the fuel cell 14 which requires less hydrogen than is currently supplied by the hydrogen gas stream 26 and/or that the hydrogen pressure is increasing beyond the desired value because less hydrogen is being consumed by the fuel cell 14 than is being supplied by the fuel reformer 12, the CPU activates the metal hydride buffer 16 to absorb hydrogen for storing in the metal hydride buffer 16 for later use.

The CPU 40 directs the metal hydride temperature regulator 50 to supply relatively cold oxidant exhaust gas stream 34 from the fuel cell 14 to the metal hydride buffer 16 to activate the metal hydride buffer to absorb hydrogen. The cold exhaust stream 34 supplied by the regulator 50 lowers the temperature of the buffer 16 to activate the buffer to absorb hydrogen. The exhaust gas stream after passing through the buffer 16 exits the buffer as shown by arrow 54.

One advantage of the present invention is that the fuel cell 14 can be made smaller relative to fuel cells in prior art fuel cell power generation systems. The fuel cell power generation system 10 is sized based on power requirement for vehicle operation, but also based on hydrogen concentration present. Given a pure hydrogen stream, the fuel cell 14 can be made smaller, as much as 30% smaller in the present invention, than would be required for a fuel cell power generation system operating with diluents present at the anode. Furthermore, in many reformate stream based systems, the catalyst is loaded heavier than is required when poisons such as carbon monoxide and sulfur can be eliminated as supported by the present invention.

Another advantage is that the response to high power demands from the electric motor 32 are essentially instantaneous. This is due to the storage of hydrogen in the metal hydride buffer 16. When a high power demand, such as acceleration or engine startup is determined, the metal hydride buffer 16 is activated to release hydrogen for consumption by the fuel cell 14 to meet the demand. The metal hydride buffer 16, being capable of desorbing hydrogen stored therein upon application of heat, enables engine startup in less than about three seconds.

For the system 10 to be able to respond essentially instantaneously to high power demands of the electric motor 32, the metal hydride buffer 16 of the present invention must be capable of storing about 100 grams of hydrogen. One hundred grams of stored hydrogen is sufficient to allow the vehicle to operate fully for up to at least about 5–12 minutes, and more preferably 7 minutes. Most metal hydrides are capable of storing about 1 weight percent of hydrogen. Thus, the metal hydride buffer 16 of the present invention must contain about 8–12 Kilograms, and preferably about 10 Kilograms of metal hydride. Suitable other magnesium based metal hydrides are capable of storing about 5 weight percent of hydrogen, thereby allowing for storage of about 100 grams of hydrogen in a 2 Kilogram metal hydride buffer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell power generation system for powering an electric vehicle, the system comprising:
   a low temperature fuel cell;
   a reactor system comprising a reformer for converting hydrogen-containing fuel into a reformate gas comprising hydrogen gas and by-product gas, the reactor system further comprising a metal membrane separator for separating the hydrogen gas from the by-product gas, thereby forming a hydrogen gas stream and a by-product gas stream;
   a metal hydride buffer, in line between the fuel cell and the membrane separator, the metal hydride buffer being capable of selectively storing hydrogen from the hydrogen gas stream and releasing the stored hydrogen; and
   a metal hydride temperature regulator that selectively directs oxidant exhaust gas and the by-product gas to the metal hydride buffer, the oxidant exhaust gas having a temperature effective to store hydrogen from the hydrogen gas stream in the metal hydride buffer, the by-product gas having a temperature effective to release hydrogen from the metal hydride buffer.

2. The fuel cell power generation system of claim 1 wherein the hydrogen gas is present in the reformate gas in an amount of about 10 to about 80 percent by volume of the reformate gas.

3. The fuel cell power generation system of claim 2 wherein the hydrogen gas stream comprises less than about 0.002 percent carbon monoxide gas, by volume, based on the volume of the hydrogen gas at all operating conditions.

4. The fuel cell power generation system of claim 1 wherein the metal hydride buffer comprises about 8–12 Kilograms of metal hydride and the metal hydride buffer is capable of storing about 100 grams of hydrogen.

5. The fuel cell power generation system of claim 1 wherein the metal membrane separator is a dense metal membrane comprising palladium metal.

6. The fuel cell power generation system of claim 1 wherein the temperature of the reformate gas in the reactor system is about 300 to about 800° C.

7. The fuel cell power generation system of claim 1 wherein the pressure inside the reformer is about 10–20 atmospheres.

8. A method for operating an electric vehicle powered by a fuel cell power generation system comprising a low temperature fuel cell, a reactor system comprising a reformer and a metal membrane separator, a metal hydride buffer, in line between the fuel cell and the membrane separator, and a metal hydride temperature regulator that selectively directs oxidant exhaust gas and by-product gas to the metal hydride buffer, the method comprising:
   supplying hydrogen-containing fuel to the reformer;
   converting hydrogen-containing fuel in the reformer to a reformate gas comprising hydrogen gas and the by-product gas;
   directing the reformate gas through the metal membrane separator to separate the hydrogen gas from the by-product gas, thereby forming a hydrogen gas stream and a by-product gas stream; and
   directing the hydrogen gas stream pass the metal hydride buffer toward the fuel cell to supply fuel to the fuel cell; and
   directing the metal hydride temperature regulator to selectively direct the oxidant exhaust gas and the by-product gas to the metal hydride buffer to selectively store hydrogen from the hydrogen gas stream in the metal hydride buffer or to release hydrogen from the metal hydride buffer, wherein the oxidant exhaust gas has a temperature effective to store hydrogen in the metal hydride buffer, and the by-product gas has a temperature effective to release hydrogen from the metal hydride buffer.

9. The method for operating an electric vehicle powered by a fuel cell power generation system of claim 8 wherein hydrogen from the hydrogen gas stream is selectively directed to the metal hydride buffer or the fuel cell in dependence upon hydrogen pressured differential and temperature control of the metal hydride buffer, wherein the hydrogen that is directed to the metal hydride buffer is stored in the metal hydride buffer.

10. The method for operating an electric vehicle powered by a fuel cell power generation system of claim 9 wherein the stored hydrogen is selectively released from the metal hydride buffer in dependence upon hydrogen pressured differential and temperature control of the metal hydride buffer.

11. A method for operating an electric vehicle powered by a fuel cell power generation system, comprising a low temperature fuel cell, a reactor system comprising a reformer and a metal membrane separator, and a metal hydride buffer, in line between the fuel cell and the membrane separator, the method comprising:
   supplying hydrogen-containing fuel to the reformer;
   converting hydrogen-containing fuel in the reformer to a reformate gas comprising hydrogen gas and by-product gas;
   directing the reformate gas through the metal membrane separator to separate the hydrogen gas from the by-product gas, thereby forming a hydrogen gas stream and a by-product gas stream; and
   directing hydrogen gas to the fuel cell to supply fuel to the fuel cell, wherein the by-product gas stream is directed from the reformer to the metal hydride buffer to activate the metal hydride buffer to release hydrogen gas from the metal hydride buffer to be directed to the fuel cell.

12. A method for operating an electric vehicle powered by a fuel cell power generation system, comprising a low temperature fuel cell, a reactor system comprising a reformer and a metal membrane separator, and a metal hydride buffer, in line between the fuel cell and the membrane separator, the method comprising:

supplying hydrogen-containing fuel to the reformer;

converting hydrogen-containing fuel in the reformer to a reformate gas comprising hydrogen gas and by-product gas;

directing the reformate gas through the metal membrane separator to separate the hydrogen gas from the by-product gas, thereby forming a hydrogen gas stream and a by-product gas stream; and directing hydrogen gas to the fuel cell to supply fuel to the fuel cell, wherein oxidant exhaust is directed from the fuel cell to the metal hydride buffer to activate the metal hydride buffer to store hydrogen gas from the hydrogen gas stream being directed from the reformer.

13. The method for operating an electric vehicle powered by a fuel cell power generation system of claim 8 wherein the hydrogen gas stream comprises less than about 0.002 percent carbon monoxide gas, by volume, based on the volume of the hydrogen gas at all operating conditions.

14. The method for operating an electric vehicle powered by a fuel cell power generation system of claim 8 wherein the temperature of the reformate gas in the reactor is about 300° C. to about 800° C.

15. The method for operating an electric vehicle powered by a fuel cell power generation system of claim 8 wherein metal membrane separator is a dense metal membrane comprising palladium metal.

16. The method for operating an electric vehicle powered by a fuel cell power generation system of claim 10 wherein the hydrogen is released from the metal hydride buffer upon sensing a load demand on the fuel cell.

17. The method of claim 8 wherein the metal hydride buffer comprises about 8–12 Kilograms of metal hydride and the metal hydride buffer is capable of storing about 100 grams of hydrogen.

18. A fuel cell power generation system for powering an electric vehicle, the system comprising:

a low temperature fuel cell that generates an oxidant exhaust;

a reactor system comprising a reformer for converting hydrogen-containing fuel into a reformate gas comprising hydrogen gas and by-product gas, the reactor system further comprising a metal membrane separator for separating the hydrogen gas from the by-product gas, thereby forming a hydrogen gas stream and a by-product gas stream; and a metal hydride buffer, in line between the fuel cell and the membrane separator, the metal hydride buffer being capable of selectively storing hydrogen from the hydrogen gas stream and releasing the stored hydrogen; and a metal hydride temperature regulator to regulate the temperature of the metal hydride buffer by selectively directing the oxidant exhaust and the by-product gas stream to the metal hydride buffer to store hydrogen in or release hydrogen from the metal hydride buffer.

19. A method for operating an electric vehicle powered by a fuel cell power generation system comprising a low temperature fuel cell, a reactor system comprising a reformer a metal membrane separator, and a metal hydride buffer, in line between the fuel cell and the membrane separator, the method comprising:

supplying hydrogen-containing fuel to the reformer;

converting hydrogen-containing fuel in the reformer to a reformate gas comprising hydrogen gas and by-product gas wherein the fuel cell generates an oxidant exhaust;

directing the reformate gas through the metal membrane separator to separate the hydrogen gas from the by-product gas, thereby forming a hydrogen gas stream and a by-product gas stream;

directing hydrogen gas to the fuel cell to supply fuel to the fuel cell; and regulating the temperature of the metal hydride buffer by selectively directing the oxidant exhaust and the by-product gas stream to the metal hydride buffer to store hydrogen in or release hydrogen from the metal hydride buffer.

* * * * *